United States Patent [19]
Johno

[11] Patent Number: 5,932,162
[45] Date of Patent: Aug. 3, 1999

[54] METHOD AND DEVICE FOR MOLDING POWDERED SLUSH

[75] Inventor: Masahiro Johno, Saitama, Japan

[73] Assignee: Kansei Corporation, Japan

[21] Appl. No.: 08/974,268

[22] Filed: Nov. 19, 1997

[30] Foreign Application Priority Data

Nov. 20, 1996 [JP] Japan ..................................... 8-309034

[51] Int. Cl.[6] ................................... B29C 41/18

[52] U.S. Cl. ......................... 264/302; 264/301; 264/306; 425/215; 425/435

[58] Field of Search .................................. 264/301, 302, 264/306; 425/215, 435, 216, 217

[56] References Cited

U.S. PATENT DOCUMENTS

| | | | |
|---|---|---|---|
| 4,722,678 | 2/1988 | Wersosky | 425/145 |
| 4,790,510 | 12/1988 | Takamatsu et al. | 249/117 |
| 4,874,565 | 10/1989 | Preston | 264/37 |

*Primary Examiner*—Jan H. Silbaugh
*Assistant Examiner*—Stefan Staicovici
*Attorney, Agent, or Firm*—Morrison Law Firm

[57] ABSTRACT

A powdered slush molding device has debris capturing devices in its reservoir. A resin material is passed back and forth through openings between the reservoir and the mold by rotating the apparatus back and forth until a film of desired thickness is formed on the mold. The capturing devices capture the debris formed during a molding process. Unwanted debris are then removed from the capturing devices either while the capturing devices remain within the reservoir or by removing them and removing the debris outside the reservoir.

11 Claims, 3 Drawing Sheets

METHOD AND DEVICE FOR MOLDING POWDERED SLUSH

BACKGROUND OF THE INVENTION

The present invention relates to a powder slush molding device that forms a film by combining a reservoir holding a resin powder material and a mold maintained at a high temperature.

In conventional powder slush molding devices, a mold, maintained at a high temperature, is attached to a reservoir and rotated or shaken. This causes resin powder material located in the reservoir to spread out completely into the mold. A film is formed by the resin powder material melting, due to contact with the hot mold, until a prescribed thickness is achieved.

During the formation of the film, a portion of the melted resin powder material adheres to a connecting section between a sealing member of the reservoir and the mold. Because the sealing member is hot, some of the resin powder that adheres to it, solidifies and forms fused debris. The debris initially may be string-like, having dimensions of approximately 30 cm–1 m. The debris mixes with the resin powder material. The rotation and the shaking may change the shape of the debris. For example, some of the debris may clump together, or become rolled into clumps, etc. The shape of the debris is immaterial to the present invention.

During repeated molding operations, this debris that has been mixed in the resin powder is exposed to high temperatures and is quickly carbonized. The carbonized product can float up and adhere to the surface of the molded film, cosmetically damaging the film. Thus, after a prescribed interval or a prescribed number of molding operations, the resin powder material must be removed from the reservoir and the debris must be removed with a comb.

This operation of removing debris after a prescribed interval or a prescribed number of molding operations requires the interruption of production. Also, since the cleaning must be performed manually, the operation requires many steps. Furthermore, since the powder material must be cleaned with a comb, the resulting dust fumes could be a health hazard.

OBJECTS AND SUMMARY OF THE INVENTION

It is an object of the present invention is to overcome the problems of the conventional technology described above.

It is a further object to provide a powder slush molding device that can easily capture debris mixed into a resin powder material without affecting production through restrictions on molding time or the number of times molding operations can be performed.

It is a still further object of the invention to provide a method of molding resin powder utilizing a powdered slush molding device so that unwanted debris can be easily removed.

Briefly stated, a powdered slush molding device has a reservoir attached to a mold. The reservoir has a holding portion with resin material disposed within it, and at least one opening between the reservoir and the mold. A capturing means is disposed within the reservoir for capturing debris formed during the molding process. A method for using this apparatus includes rotating the device until a desired resin film is formed on the mold.

In order to achieve this object, the present invention employs a powdered slush molding device in which a powder resin material, which serves as the material for the powder-slush molding, is held in a holding chamber of a reservoir. A mold is attached to the reservoir and a molding surface of the mold communicates with the holding chamber through at least one entry opening in the reservoir. The mold is kept heated so that when the powder resin material is introduced into the mold, the powder resin material melts and forms a film on the mold. Melted resin powder which does not attach to the mold forms material which eventually falls back into the holding chamber and mixes in with the resin powder. A capturing means, including a shaft-shaped body having cavities and projections on its surface, is used to capture the debris mixed into the resin powder material.

In use, the apparatus is rotated about a horizontal axis until a resin material film of a desired thickness is formed on the molding surface. The mold is then removed from the mold-reservoir combination along with the resultant film. Finally, the debris are removed from the catching means.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1A:
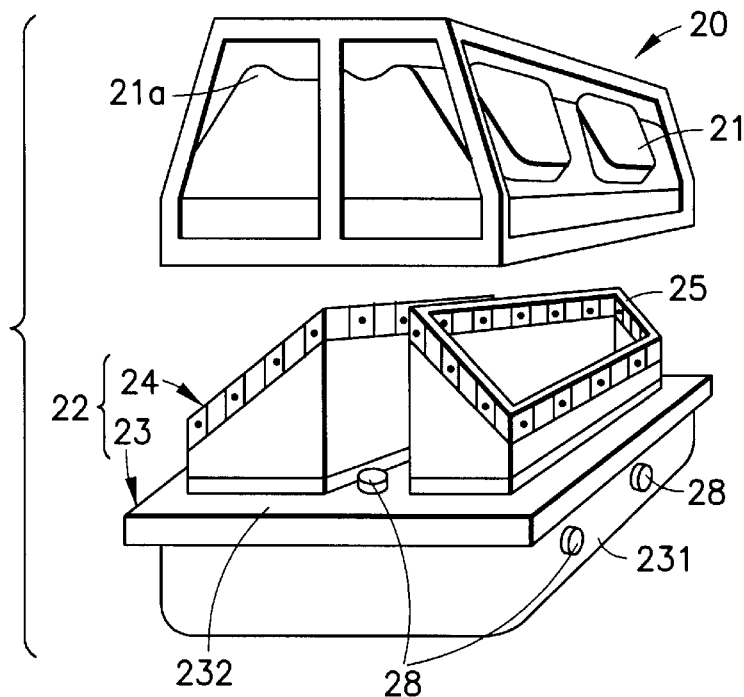
FIG. 1(a) is an exploded schematic drawing showing a device according to a first embodiment of the present invention.
Figure 1B:
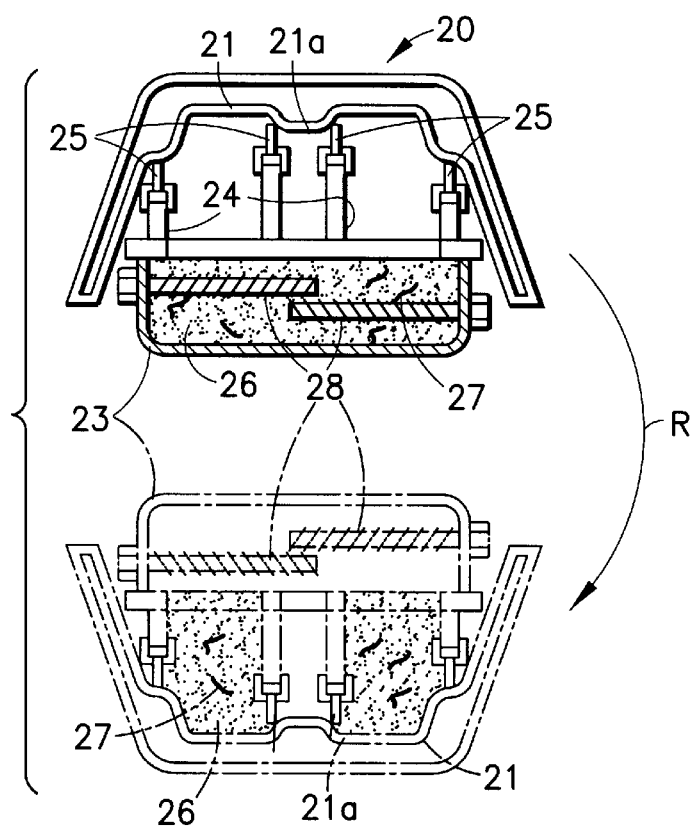
FIG. 1(b) is a drawing to which reference will be made in describing how molding is performed with the first embodiment.

Referring to FIGS. 1(a) and 1(b), a powdered slush molding device is shown generally at 20. Reservoir 22, includes a holding chamber 23 on the bottom of the reservoir and a pair of entry openings 24 for allowing entry and exit of materials disposed within holding chamber 23. A sealing member 25, preferably of an elastic material, is fixed to the edge of entry openings 24. A resin powder material 26, for forming the film, is shown disposed in holding chamber 23. Debris 27, are shown mixed in resin powder material 26. Capturing means 28, shown more completely in FIGS. 2(a) and 2(b) includes a base 32, and a shaft 28a with cavities and projections on the surface of the shaft for capturing debris. For example, shaft 28a can be formed with a screw-shaped groove or a spiral-shaped projection.

As shown in FIG. 1(b), when powdered slush molding device 20 is used, mold 21 is heated to a high temperature and attached to reservoir 22. Sealing member 25 ensures that mold 21 and reservoir 22 are kept sealed together. Powdered slush molding device 20 is then rotated and shaken in the direction indicated by arrow R so that the structure ends up inverted as shown by the image having dotted lines. This allows resin powder material 26 to drop down to mold 21 and melt in places where the resin comes into contact with molding surface 21a. Sealing member 25 also heats up because of heat transferred to it from the mold through conduction. As resin powder material 26 drops to mold 21, some of the resin touches now heated sealing member 25 and solidifies. This solid resin powder on the sealing member 25 later becomes fused debris 27.

Then, powdered slush molding device 20 is brought back to its original orientation as shown by the image with solid lines. This procedure of rotating the powdered slush molding device 20 is repeated a prescribed number of times corresponding to the size and shape of the molded product. The rotations stop when the molded product (film) is at a prescribed thickness. When that occurs, the powdered slush molding device 20 is then reoriented so that the mold 21 is again above the reservoir 22 as shown by the image with solid lines. Unmelted surplus resin powder material 26 is returned from mold 21 to the holding chamber 23. Mold 21 and reservoir 22 are then separated, and mold 21 is cooled. The resulting film is removed from molding surface 21a, thus completing the film forming process.

In this film forming process, the rotation and shaking that is performed moves resin powder material 26 back and forth between holding chamber 23 and mold 21 through entry openings 24. As resin powder material 26 flows back and forth, debris 27 formed on sealing member 25, get mixed into resin powder material 26, and finally becomes caught on capturing means 28.

It has been observed that debris 27 is formed from resin powder material 26 especially that which has been caught between sealing member 25 and heated mold 21. This caught resin powder material melts and forms a film. This film adheres to fluid resin powder material as it is rotated and shaken, and thus the film is stretched to form debris 27. This debris drops into holding chamber 23 and is mixed into resin powder material 26. Debris 27 are often found to have lengths from 30 cm to almost 1 meter. Therefore, in the film forming process, the probability that the debris 27 will become caught on capturing means 28 is very high, and thus the debris 27 can be captured and removed easily.

Figure 2A:
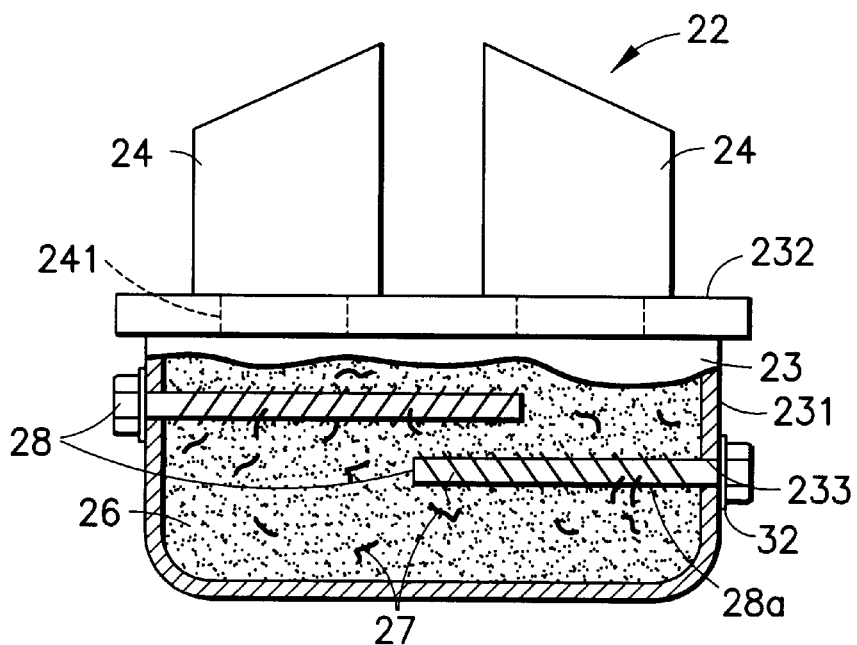
FIGS. 2(a), and 2(b) are partial cross-section drawings of the first embodiment.
Figure 2B:
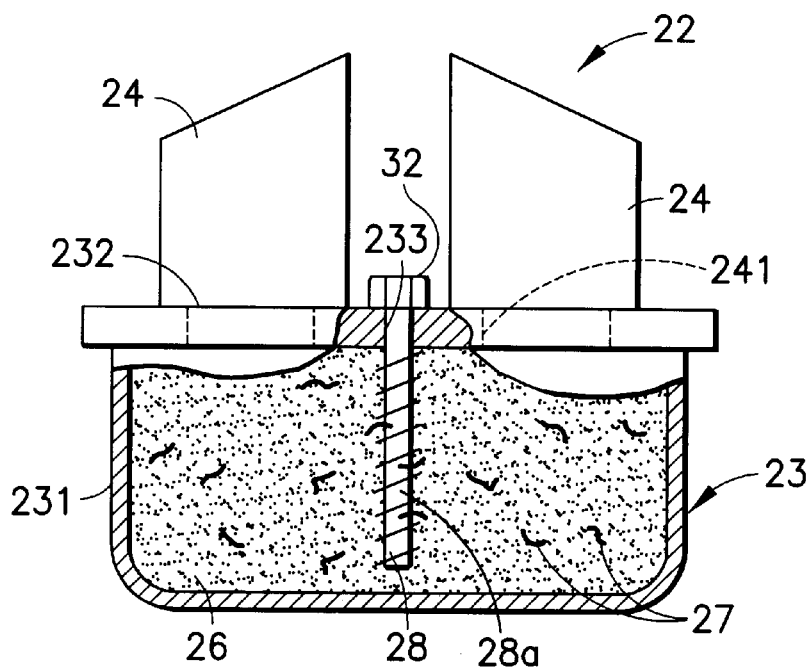

Referring now to FIG. 2(a) and FIG. 2(b), a plurality of capturing means 28 are mounted on side wall 231 and upper wall 232 of holding chamber 23 with the implementation of screw holes 233 formed on side wall 231 and upper wall 232. Shafts 28a of capturing means 28 mounted on side wall 231 extend past an opening 241 of entry openings 24. After a production lot is completed, debris 27 caught on shaft 28a are removed by hand through entry openings 24. This removal is done during a time that mold 21 is out of service and so production is not affected. A user may also open upper wall 232 of holding chamber 23 and manually remove the debris. Furthermore, capturing means 28 itself can be rotated out of screw hole 233 and removed from reservoir 22 so that debris 27 are removed along with capturing means 28. Debris 27 can then be easily removed from now isolated shaft 28a. Then, capturing means 28 is screwed back into screw hole 233 to allow the next production lot to begin.

According to the invention as described above, capturing means 28 captures debris 27 mixed in resin powder material 26 that were generated during film formation. The capturing means 28 captures debris 27 each time the powdered slush molding device 20 is rotated or shaken during film formation. The capturing is performed automatically, and the cavities and projections formed on the surface of shaft 28a allow debris to be captured efficiently. This eliminates the need to remove debris periodically using a comb, and does not require molding operations to be interrupted. Thus, productivity is improved, and the defect rate is decreased.

A user need only remove the debris 27 tangled on shaft 28a when a production lot is completed. As described more clearly above, the removal can be effectuated either through entry openings 24 or by removing capturing means 28 itself from reservoir 22 and then removing the debris 27. Thus, the unhealthy generation of powder fumes that accompanies the use of a comb is eliminated, the debris cleaning process is greatly simplified, and productions cycles are uninterrupted.

Figure 3:
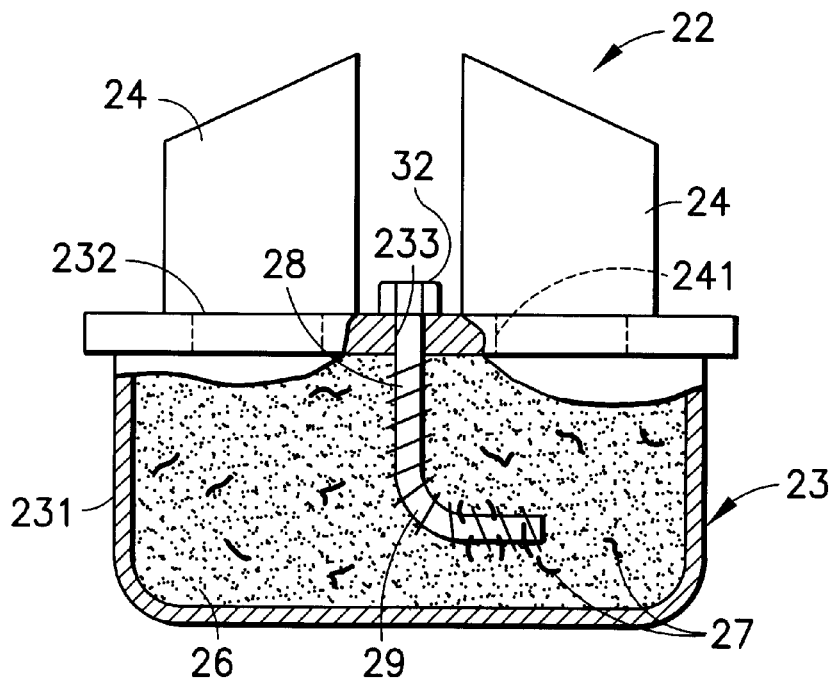
FIG. 3 is a partial cross-section drawing showing a second embodiment of the present invention.

Referring now to FIG. 3, a second embodiment of the powder slush molding device of the present invention is shown generally at 22. Elements that are identical to those in the first embodiment are given like numerals and the corresponding descriptions are accordingly omitted.

Shaft 29, replaces shaft 28a of capturing means 28 of the first embodiment. Shaft 29 extends from base 32 and then bends substantially perpendicularly with respect to the base 32. As in the first embodiment described above, shaft 29 is formed with a screw-shaped groove or a spiral projection. Shaft 29 is inserted roughly perpendicular to upper wall 232 through screw hole 233 and is bent roughly midway in holding chamber 23 so that it extends close to opening 241 of entry openings 24. A plurality of capturing means 28, each including shaft 29, are screwed into respective screw holes 233. Each capturing means extends from upper wall 232 of holding chamber 23 into the holding chamber 23 itself as was described in the first embodiment. Screw hole 233 is used for attachment and removal of capturing means 28 with shaft 29, and is formed as a somewhat large circular hole so that bent shaft 29 can be inserted easily. Shaft 29 is inserted at an angle and then screwed in.

Alternatively, a slot (not shown) can be used instead of screw hole 233 in order to allow shaft 29 of capturing means 28 to be more easily inserted. In that case, a cover (not shown) would be disposed over the slot. Shaft 29 would be fixed to the cover and would extend downward into holding chamber 23. Shaft 29 would be then screwed into screw hole 233 so that the cover would overlay the slot.

With shaft 29 structured in this manner, either the vertical section or the horizontal section of the shaft would cross the flow of the resin powder material 26 in holding chamber 23 and thus increase the probability of capturing debris. This is because, during film formation, the resin powder and any debris move back and forth between holding chamber 23 and mold 21. Now portions of shaft 29 would intersect that flow. Therefore, debris 27 can be caught easily and effectively with the utilization of shaft 29.

Figure 4:
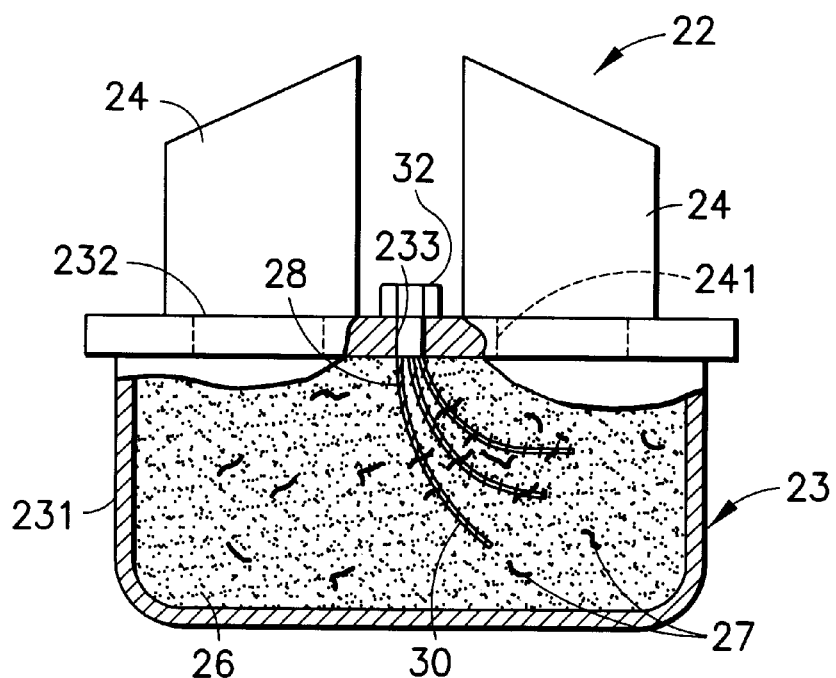
FIG. 4 is a partial cross-section drawing showing a third embodiment of the present invention.

Referring now to FIG. 4, there is shown a third embodiment relating to the powder slush molding device of the present invention. Elements that are in common with the first and second embodiments are assigned like numbers and overlapping descriptions are omitted. A plurality of shafts 30 replace shaft 28a and shaft 29 of the first and second embodiments respectively. Shafts 30 are identical in shape to shafts 28a and 29 from the first and second embodiments or slightly thinner. However, in this embodiment, a plurality of shafts 30 are connected to a single base 32. The plurality of shafts 30 are arranged together like a claw.

These claw-shaped shafts 30 are inserted from screw hole 233 of upper wall 232. One shaft 30 is bent with respect to the base 32 so that it extends close to entry openings 24 of opening 241. Another shaft 30 is bent toward the bottom of holding chamber 23. Remaining shafts 30 are disposed so that they extend between the two shafts described above. Shafts 30 are all inserted into holding chamber 23 from upper wall 232 through screw hole 233.

Screw hole 233 allows shafts 30 to be attached and removed. In order to allow claw-shaped shafts 30 to be easily inserted, screw hole 233 can be formed as a slot (not shown) as described in the second embodiment.

During the film forming process, shafts 30 described above provide even more efficient capture of debris 27 since they can intersect the complex flows of resin powder material 26 in holding chamber 23. Consequently, debris 27 formed in resin powder material 26 have an even greater chance of getting captured on this embodiment of the capturing means.

In the described embodiments, 2 entry openings are shown illustrating a situation when more than one mold is being formed at one time. However, entry openings 24 can include only one opening as well. The number of openings corresponds to the number of molds being made during the pertinent cycle.

Debris 27 is created by melted or carbonized resin powder material 26. It can take the form of any shape including ball shaped. Such a ball shape could be formed if debris 27 is rolled around itself.

In the described embodiments, resin powder material 26 may be a vinyl chloride resin that has been suspension polymerized and to which has been added a plasticizing or a stabilizing agent. The resin is then processed to form a powder having an outer diameter of approximately 200 microns. However, any material which has the property of being able to flow through an opening when gravity urged and which solidifies when heated would work with this invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A powder slush molding device for molding film comprising:
    a reservoir having a holding chamber and at least one entry opening;
    said holding chamber being effective for holding a resin powder material, for forming said film;
    a mold for shaping said resin powder material attached to said reservoir, said mold having a molding surface, said molding surface communicating with said holding chamber through said at least one entry opening; and
    at least one capturing means detachably mounted to said reservoir, said capturing means including at least one surface shape effective for capturing fused debris generated during film formation; wherein said capturing means includes means on its surface for catching said fused debris.

2. A powder slush molding device for molding film comprising:
    a reservoir having a holding chamber and at least one entry opening;
    said holding chamber being effective for holding a resin powder material, for forming said film;
    a mold for shaping said resin powder material attached to said reservoir, said mold having a molding surface, said molding surface communicating with said holding chamber through said at least one entry opening;
    at least one capturing means detachably mounted to said reservoir, said capturing means including at least one surface shape effective for capturing debris generated during film formation;
    wherein said at least one capturing means comprises at least one shaft having at least one of cavities and projections on a surface; and
    said capturing means extends into said holding chamber of said reservoir.

3. A powder slush molding device as claimed in claimed 2 wherein said at least one shaft includes at least two substantially linear portions, each portion being substantially perpendicular to the other.

4. A powder slush molding device for molding film comprising:
    a reservoir having a holding chamber and at least one entry opening;
    said holding chamber being effective for holding a resin powder material, for forming said film;
    a mold for shaping said resin powder material attached to said reservoir, said mold having a molding surface, said molding surface communicating with said holding chamber through said at least one entry opening;
    at least one capturing means detachably mounted to said reservoir, said capturing means including at least one surface shape effective for capturing debris generated during film formation;
    wherein said at least one capturing means includes a plurality of capturing means;
    said plurality of capturing means each comprises a base portion and a plurality of shafts, each shaft extending from a respective base portion; and
    said at least one surface shape has at least one of cavities and projections on a surface; and
    said plurality of shafts are each bent in a substantially curved shape stemming from a respective base portion, each shaft further having a different curved shape with respect to the base portion.

5. A method for capturing fused debris during molding of a film comprising:
    placing a resin powder material in a reservoir;
    affixing said reservoir to a mold;
    heating said mold;
    moving said reservoir and said mold in a manner to pass said resin powder material through at least one opening between said reservoir and said mold a sufficient number of times to build up a desired thickness of solidified resin material on said mold;
    forming at least one capturing surface on at least one capturing means; and
    placing said at least one capturing means in said reservoir in a position where contact with and capture of said fused debris is performed.

6. A method for capturing debris during molding of a film comprising:
    placing a resin powder material in a reservoir;
    affixing said reservoir to a mold;
    heating said mold;
    moving said reservoir and said mold in a manner to pass said resin powder material through at least one opening between said reservoir and said mold a sufficient number of times to build up a desired thickness of solidified resin material on said mold;
    forming at least one capturing surface on at least one capturing means;
    placing said at least one capturing means in said reservoir in a position where contact with and capture of said debris is performed;

removing said reservoir from said mold upon completion of the molding process; and removing said fused debris from said capturing surface.

7. A method for capturing debris during molding of a film comprising:

placing a resin powder material in a reservoir;

affixing said reservoir to a mold;

heating said mold;

moving said reservoir and said mold in a manner to pass said resin powder material through at least one opening between said reservoir and said mold a sufficient number of times to build up a desired thickness of solidified resin material on said mold;

forming at least one capturing surface on at least one capturing means; and placing said at least one capturing means in said reservoir in a position where contact with and capture of said debris is performed;

wherein said at least one capturing means comprises at least one shaft having at least one of cavities and projections on a surface, and where said at least one capturing means extends into said reservoir from at least one of an upper wall and a side wall of said reservoir.

8. A method for molding of a film as claimed in claim 7 wherein said at least one shaft includes at least two substantially linear portions each portion being substantially perpendicular to the other.

9. A method for molding of a film as claimed in claim 5 wherein:

said at least one capturing means includes a plurality of capturing means;

said plurality of capturing means each comprises a base portion and a plurality of shafts, each shaft extending from a respective base portion;

said at least one capturing surface has at least one of cavities and projections; and said plurality of shafts are each bent in a substantially curved shape stemming from a respective base portion, each shaft further having a different curved shape with respect to the base portion.

10. A method for molding of a film as claimed in claim 6 where said step of removing said debris comprises removing said at least one capturing means from said reservoir.

11. A method according to claim 5 wherein the step of forming at least one capturing surface includes forming means on said capturing surface effective for catching said fused debris thereon.

* * * * *